United States Patent Office 3,327,014
Patented June 20, 1967

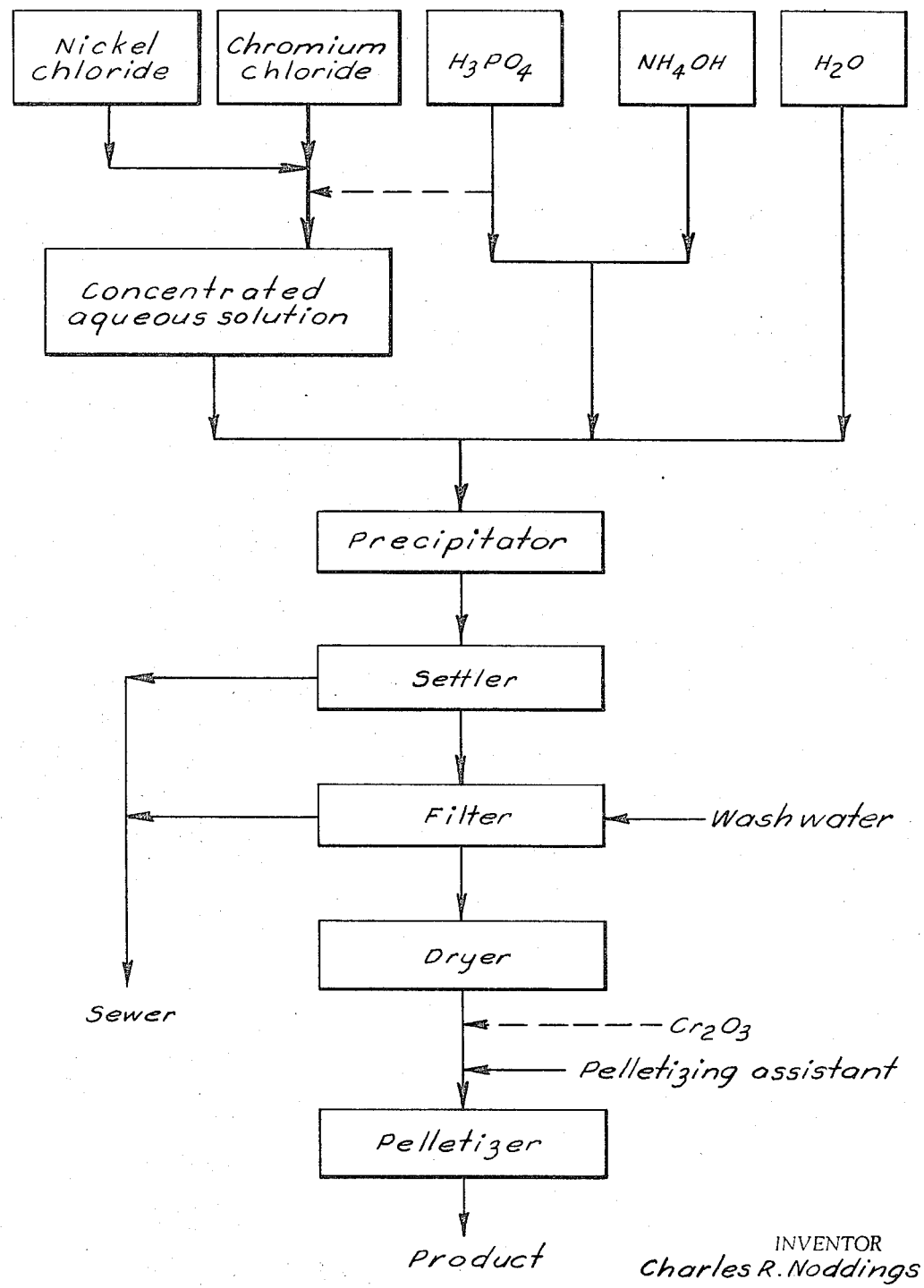

3,327,014
METHOD FOR ISOMERIZING ALPHA OLEFINS TO BETA OLEFINS WITH NICKEL-CHROMIUM PHOSPHATE
Charles R. Noddings, Midland, Mich., assignor to The Dow Chemical Company, Midland, Mich., a corporation of Delaware
Filed Jan. 6, 1964, Ser. No. 335,811
6 Claims. (Cl. 260—683.2)

This invention concerns a new catalyst and a process employing the catalyst for isomerization of alpha olefins, having four or more carbon atoms in the molecule, to beta olefins.

It is, of course, well known that aliphatic hydrocarbons, e.g., petroleum fractions (mixed hydrocarbons) or individual paraffins or olefins, can be pyrolyzed to obtain a mixture of products comprising a small, though appreciable, proportion of conjugated diolefins and a larger proportion of shorter length unsaturate products. However, it is unusual to find among those metals capable of complex compound formation and which in such form are dehydrogenation and/or cracking catalysts, one group of complexes which are also capable of isomerizing alpha olefins to beta olefins in near quantitative yields.

It is an object of this invention to provide an improved method for the isomerization of $C_4$ and higher $\alpha$-olefinic hydrocarbons to their $\beta$-olefinic forms. Another object of the present invention is to provide such a method whereby useful organic products (that is products other than $CO_2$, carbon and hydrogen from the isomerization) are obtained in quantities which increase the economical value of the products over that of the starting carbon compounds. A further object is to provide a set of operating conditions under which the new catalyst may effectively be used for the foregoing purposes. Other objects will be apparent from the following description of the invention.

We have found that a nickel-chromium phosphate containing an average of between 6 and 12 and preferably from about 6 to about 9 atoms of nickel per atom of chromium is, under certain operating conditions, effective in catalyzing the thermal isomerization of $\alpha$-$C_4$ and higher hydrocarbons, to $\beta$-$C_4$ and higher hydrocarbons.

The catalyst is prepared by mixing together water-soluble metal salts of nickel and chromium with a water-soluble form of the ortho-phosphate moiety ($PO_4^\equiv$) in an aqueous medium under conditions such that the pH of the complexing environment is within the range of from 7 to 10. Material of good catalytic quality is obtained when the nickel and chromium are employed to provide from 6 to 12 moles of nickel per mole of chromium. Further, while not critical, but desirable, the phosphate moiety is employed in a slight excess over that which is theoretically necessary to combine with the metal ions to form a metal ortho-phosphate. It is to be understood that the pH may, but does not have to be maintained within the operative range during mixing but can be adjusted, after mixing, by addition of a base or acid as necessary to the reaction mixture to bring the solution within the desired range thereby causing precipitation of a catalytic material.

The contacting and mixing of the reactants in accordance with the above recitation can be carried out in several manners, such as simultaneously, stepwise or intermittently, each either in a batchwise or continuous manner.

Examples of salts which may be used as starting materials in preparing the catalyst are the chlorides, bromides, nitrates, and acetates, etc., of nickel and chromium. Examples of soluble phosphates that may be employed as starting materials are, for example, phosphoric acid, di-ammonium phosphate, etc.

The catalyst can also be prepared in either a batchwise manner or a continuous manner by feeding separate streams of an alkali, preferably aqueous ammonia, although other bases can be employed as well as two different bases, though NaOH produces an inferior catalyst, and as either a single or as separate streams an aqueous solution of nickel and chromium salts (in relative proportions corresponding to between 6 and 12 and preferably about 6 to 9 atoms of nickel per atom of chromium), and either a separate or as a part of any one of the aforesaid streams a dissolved ortho-phosphate, into a reaction chamber. The relative rates of flow being adjusted such that the resultant mixture will achieve continuously or upon completion of the mixing a pH between 7 and 10. It is desirable in a continuous or stepwise operation to retain within the reaction zone a portion of the nickel-chromium phosphate which forms and precipitates. This is conveniently achieved by adjusting the outflow of the nickel-chromium phosphate precipitated to retain a portion of the flocculent material which settles rapidly to form, as a lower layer of the resultant mixture, an aqueous nickel-chromium phosphate slurry that contains 2% by weight or more, usually from 7.5 to 10%, of the nickel-chromium phosphate. The reaction mixture, or preferably the settled lower layer thereof, may be filtered to obtain a filter cake which contains 10% or more, usually about 22%, of the nickel-chromium phosphate.

In order to obtain a rapid settling nickel-chromium phosphate of good catalytic activity, it is important that the two or more streams of the above-mentioned starting materials flow into admixture with one another, e.g. within a body of the resulting mixture, at relative rates such as to maintain the resultant mixture at a pH value between 7 and 10. The phosphate precipitated from a mixture of higher pH value which is then adjusted to about 7 to 10 is of good catalytic activity, but is extremely slow in settling. The phosphate precipitated from a mixture of pH value below 7 settles rapidly, but is less active as a catalyst for the isomerization of $C_4$ hydrocarbons than is phosphate precipitated from mixtures within the range of 7 to 10 pH values. It also appears necessary, in order to obtain a nickel-chromium phosphate product of rapid settling rate, that a portion of the precipitated phosphate be retained in the mixing and reaction zone so that, once the process is started, the catalyst is being formed and precipitated in the presence of a slurry of the nickel-chromium phosphate. It is probable that the catalyst already precipitated serves as nuclei for precipitation of further amounts of catalytic material and aids in controlling the particle size and physical form of the material undergoing precipitation, but the invention is not restricted to this theory as to a reason for the result obtained. Presence of preformed particles of catalyst during precipitation of further amounts of the latter is not, of itself, sufficient to cause formation of a rapid settling product, i.e., it is also necessary that the reaction mixture as a whole be maintained at an average pH value of between 7 and 10.

The procedure in bringing the two streams of starting materials together and admixing them also has an influence on the rate of settling of the catalyst which is precipitated. It is desirable that the points of feed, to the aqueous mixture in the mixing chamber of the streams of the two starting materials, be remote from one another and that the mixture be stirred, or otherwise agitated, during introduction of the starting materials. Usually, inlets for the different kinds of starting materials are separated by a distance of a foot or more. Either starting material may, of course, be introduced through a plurality of inlets. It is probable that these precautions of separating the points of feed of the different starting materials and of agitation the mixture result in actual contact between the starting materials in a zone, or zones, of approximately the pH value which is average for the mixture as a whole, i.e. the procedure just recommended presumably results in formation and coagulation of nickel-chromium phosphate in zones which are actually at pH values between 7 and 10. It will be understood that the minimum distance between points of feed of the different starting materials is dependent in part upon the rates of feed, and that it may be less with low rates of feed than with high rates of feed. An increase in the degree, or efficiency, of stirring of the mixture will also permit a decrease in minimum distance between the points of feed. In actual manufacture of the phosphate, the points of feed of starting materials may advantageously be separated by a distance of 5 feet or more.

Usually water is employed as the solvent for the starting materials, but other ionizing solvents, e.g., aqueous alcohol, may in some instances be used.

In any event after the reaction is complete the precipitate is separated from the liquor by filtration or decantation and is washed with water, decanting or filtering after each washing. The washing should be carried out so as to remove as thoroughly as possible readily soluble compounds from the product, since such impurities have a disturbing and erratic action on the thermal decomposition of hydrocarbons. Of particular attention are the unreacted chlorides or by-product chlorides which, if retained in the catalyst, tend to deactivate the latter. The catalyst is, at this stage in its preparation, a solid or gel-like substance which is apparently amorphous.

After being washed with water, the product is dried, usually at temperatures between 60° and 150° C. The dried product is a hard gel usually of greenish color. The gel may be crushed or otherwise reduced to granules, or small lumps, and be used directly as an isomerization catalyst. However, it is preferably pulverized, e.g., to a particle size capable of passing a 28-mesh screen, and the powdered product is treated with a lubricant and is pressed into the form of pills, tablets, or granules of sizes suitable for use as a catalyst, e.g., into the form of tablets of from $\frac{1}{16}$ to $\frac{1}{2}$ inch diameter. The lubricant serves to lubricate the particles during the operation of pressing them into pills and its use permits the formation of pills of greater strength and durability than are otherwise obtained. As the lubricant we preferably use a substance capable of being removed by vaporization or oxidation from the product, e.g., a substance such as graphite, a vegetable oil, or a hydrocarbon oil, etc.

$C_4$ and higher hydrocarbons can be isomerized in the presence of the catalyst of the present invention at temperatures between 100° and 300° C., and in some instances at temperatures as much as 50° C. above this range.

Except for the foregoing limitations, the conditions under which the isomerization reaction is carried out may be varied widely. Also, the method is operable at atmospheric, subatmospheric, or at superatmospheric pressures, provided the hydrocarbon reactant is in vaporized form. In some instances, the yield of isomerization product decreases upon increase of the reaction pressure above atmospheric. However, the ability to operate at an increased pressure is of considerable advantage, since condensation of the reaction products may thereby be facilitated. In general, the proportion of hydrocarbon reacted and also the amount of by-product formation per pass through the catalyst bed tend to decrease with increase in the rate of vapor flow, and vice versa.

In producing isomerized hydrocarbon products in accordance with the invention, a reaction chamber is charged with the granular catalyst and the lubricant employed is removed from the catalyst. This is usually accomplished by passing an $O_2$-containing gas such as oxygen or air, preferably a mixture of about equal volumes of air and steam, through the catalyst bed at a high temperature, e.g., 450° to 750° C. When the lubricant used in preparing the catalyst granules is a substance capable of being vaporized, e.g., a mineral or vegetable oil, the step of treating the catalyst with air may be preceded by one of passing an inert gas or vapor such as steam, nitrogen, or carbon dioxide over the catalyst so as to vaporize at least a portion of the binding agent from the catalyst granules.

After freeing the catalyst of the lubricant, the catalyst bed is swept free of the $O_2$ or air with steam and is heated to the desired reaction temperature, preferably by passing superheated steam through the same. The hydrocarbon reactant, e.g., butylene, amylene, hexylene, or heptylene, having at least four carbon atoms is then passed through the catalyst bed at a temperature between 100° and 300° C. The usual procedure is to pass the hydrocarbon gas which has been heated to 100° C. or above, i.e., to the desired reaction temperature, through the bed of catalyst. However, the heat may be supplied in other ways, e.g., by externally heating the catalyst chamber itself. As hereinbefore mentioned, the rate of vapor flow through the catalyst chamber may be varied widely, but in practice the flow usually corresponds to between 100 and 700 liters of the hydrocarbon (expressed as at 0° C. and 760 millimeters pressure) per liter of catalyst bed per hour.

The vapors issuing from the catalyst chamber are ordinarily passed through heat exchangers and other cooling devices to condense the hydrocarbon products.

During use in the process, the catalyst gradually accumulates a small amount of carbon, or non-volatile organic material, and loses its activity. Accordingly, flow of the hydrocarbon starting material is periodically interrupted and air, admixed with the steam is blown through the catalyst bed, e.g., at temperatures between 450° and 700° C., to oxidize and remove the carbonaceous or organic material and thus reactive the catalyst. Usually several hours are required to carry out this reactive step. However, if, during compounding of the catalyst into tablet form, an agent having the property of catalyzing the oxidation of carbon is admixed therewith, the time subsequently required for reactivating the catalyst with steam and air may be reduced markedly; for instance, the incorporation of one or two percent by weight of chromic oxide in the catalyst tablets facilitates reactivation of the catalyst. Other agents having the property of catalyzing the burning of carbon are known to the art.

After completing the reactivation step, the catalyst chamber is again swept free of air with steam and the introduction of hydrocarbons is resumed. Usually, reactivation of a catalyst is advisable after several hours of use in the isomerization reaction. In practice, two or more catalyst chambers are preferably employed in a system provided with connections for passing the reaction mixture alternately through different catalyst beds. One catalyst bed is usually employed in the isomerization reaction while another is being heated, reactivated, and cooled in consecutive operations. By operating in this manner, the isomerization reaction may be carried out continuously.

The following example illustrates the present invention, but is not to be construed as limiting:

*Example*

In the manner shown in the accompanying drawing, 22.2 gram moles of nickel chloride as a 26.8 weight percent aqueous solution thereof was mixed in a vessel with 2.46 gram moles of chromium chloride as a 8.1 weight percent aqueous solution and with 17.8 gram moles of phosphoric acid as a 75.1 weight percent aqueous solution and the ingredients total 59 gallons by addition of Huron Lake water, and the resulting mixture was simultaneously added with a volume of 55.34 gallons of Huron water which includes 53.3 gram moles of an aqueous 11.4 weight percent ammonium hydroxide solution into a 13.5 gallons reaction vessel. The reaction mass was continuously stirred and maintained at a pH of 8.2 by controlling the rate of introduction of the ammonium hydroxide solution. The reaction was carried out at room temperature. The precipitate was continuously removed to a settler, and was then allowed to settle, the supernatant liquid above the precipitate overflowing and the resulting thick slurry periodically removed, filtered and washed with water. The filtrate was discarded. In the specific instance the slurry was washed on a Buchner filter with water until chloride free, then removed and dried at 100° C., in a rotary drier. The dry powder was recovered to the extent of 3422 grams in a 24-hour period, and was crushed, mixed with 2% by weight of a lubricant grade graphite, and expressed into pellets about ¼ inch in diameter and ¼ inch long. The graphite was burned off by treating the pellets with air and steam at about 650° C. for about six hours.

The resulting catalyst pellets were tested as an isomerization catalyst as shown in the following table at atmospheric pressure, and several hours of continuous operation, wherein all yields are based on the alpha olefin converted.

I claim:
1. The method which comprises isomerizing an α-olefinic hydrocarbon having at least 4 carbon atoms by passing the hydrocarbon at a temperature between 100° and 300° C. in contact with a catalyst composed of a metal phosphate material consisting essentially of phosphate radicals chemically combined with nickel and chromium in the relative proportions of between 6 and 12 atoms of nickel per atom of chromium which metal phosphate material is preparable by mixing a solution of soluble salts of nickel and chromium with a solution of a soluble ortho-phosphate and precipitating said metal phosphate material from the mixture at a pH of between about 7 to 10.
2. The method of claim 1 which comprises passing hydrocarbon vapors containing a normal 1-hexene into contact with said catalyst.
3. The method of claim 1 which comprises passing hydrocarbon vapors containing a normal 1-heptene into contact with said catalyst.
4. The method of claim 1 which comprises passing hydrocarbon vapors containing 2-methyl-1-pentene into contact with said catalyst.
5. The method of claim 1 which comprises passing hydrocarbon vapors containing a normal pentene-1 into contact with said catalyst.
6. The method of claim 1 wherein said hydrocarbon comprises butene-1.

| Feed Stock | 97.5% 1-Hexene | 95% 1-Heptene | 97% 2-methyl-1-pentene, 2% 2-methyl-2-pentene, 1% Unknown | | 20% Pentene-1, 80% | 30.5% Butene-1, 67.5% Butene-2 |
|---|---|---|---|---|---|---|
| V./v. hour (STP) Feed Stock | 101 | 70.8 | 540 | 1,325 | 105 | 181 |
| Temp., °C | 210 | 214 | 150 | [1] 132.5 | 214 | 210 |
| Product Data,[2] percent Conversion per pass to beta olefin | 86.7 | 94.4 | 75 | 71.5 | 25 | 36.5 |
| Feed Stock | 98% butene-1 | | | | | |
| V./v. hour (STP) Feed Stock | 104 | | | | | |
| Temp. °C | 210 | | | | | |
| Percent Conversion per pass to beta olefin | 81 | | | | | |

[1] The feed was introduced at 150° C. The listed temperature is the exit temperature of the gases.
[2] All yields were 100% based on alkene-1 to alkene-2.

References Cited
UNITED STATES PATENTS

| | | |
|---|---|---|
| 1,882,712 | 10/1932 | Andrusson et al. _____ 252—437 |
| 2,281,804 | 5/1942 | Ruthruff _____ 260—683.2 |
| 2,336,600 | 12/1943 | Fawcett _____ 260—683.2 |
| 2,569,092 | 9/1951 | Deering _____ 260—682 |
| 3,149,081 | 9/1964 | Bowman et al. _____ 252—437 |

DELBERT E. GANTZ, *Primary Examiner.*

R. H. SHUBERT, *Assistant Examiner.*

UNITED STATES PATENT OFFICE
CERTIFICATE OF CORRECTION

June 20, 1967

Patent No. 3,327,014

Charles R. Noddings

It is hereby certified that error appears in the above numbered patent requiring correction and that the said Letters Patent should read as corrected below.

Column 1, line 19, after "shorter" insert -- chain --; column 4, line 42, for "reactive" read -- reactivate --; line 43, for "reactive" read -- reactivation --; columns 5 and 6, in the table, heading to the fifth column, after "80%" insert -- Pentene-2 --; same table, before the first subscript under the table, insert -- 1 --.

Signed and sealed this 18th day of June 1968.

(SEAL)
Attest:

Edward M. Fletcher, Jr.
Attesting Officer

EDWARD J. BRENNER
Commissioner of Patents